(12) United States Patent
Ide

(10) Patent No.: US 7,224,141 B2
(45) Date of Patent: May 29, 2007

(54) POSITION CONTROLLER OF MOTOR

(75) Inventor: Yuuji Ide, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 10/531,892

(22) PCT Filed: Oct. 21, 2003

(86) PCT No.: PCT/JP03/13442

§ 371 (c)(1),
(2), (4) Date: Apr. 20, 2005

(87) PCT Pub. No.: WO2004/036730

PCT Pub. Date: Apr. 29, 2004

(65) Prior Publication Data

US 2006/0138990 A1    Jun. 29, 2006

(30) Foreign Application Priority Data

Oct. 21, 2002    (JP) .............................. 2002-306421

(51) Int. Cl.
*H02P 23/00*    (2006.01)
*H02P 25/00*    (2006.01)

(52) U.S. Cl. ..................... 318/807; 318/560; 318/632; 318/655; 318/767; 318/800

(58) Field of Classification Search ........ 318/560–632, 318/432–434, 700–810
See application file for complete search history.

(56) References Cited

U.S. PATENT DOCUMENTS

| | | | | |
|---|---|---|---|---|
| 4,914,365 A | * | 4/1990 | Murakami et al. .......... 318/609 |
| 5,126,342 A | * | 6/1992 | Chakravarty et al. .... 514/235.8 |
| 5,134,354 A | * | 7/1992 | Yamamoto et al. ......... 318/609 |
| 5,691,615 A | * | 11/1997 | Kato et al. .................. 318/609 |
| 5,786,678 A | * | 7/1998 | Kobayashi et al. ......... 318/677 |
| 6,204,622 B1 | * | 3/2001 | Tsuruta ....................... 318/609 |

(Continued)

FOREIGN PATENT DOCUMENTS

EP    0311127    4/1989

(Continued)

*Primary Examiner*—Lincoln Donovan
*Assistant Examiner*—Tyrone Smith
(74) *Attorney, Agent, or Firm*—Rankin, Hill, Porter & Clark LLP

(57) ABSTRACT

A position controller of a motor in which the position time can be shortened even if an external force is applied. A speed control unit (13) comprises a compensation low-pass filter (133) having a transfer function corresponding to a delay of a speed control system. The speed control unit (13) further comprises an integral control system including a speed integrator (132) for integrating the difference between a speed and a delay speed command to the low-pass filter (133) compensating the delay in the speed control unit. A proportional control system outputting a command proportional to the speed command, and a multiplying means (134) for multiplying the sum of outputs from the integral control system and the proportional control system by a speed proportional gain and outputting the result as a torque command. A speed feedback low-pass filter (135) having a transfer function for preventing a ripple from appearing in the torque command due to a quantization error and/or a positional error at a position detection unit is also provided.

22 Claims, 10 Drawing Sheets

U.S. PATENT DOCUMENTS

| | | | |
|---|---|---|---|
| 6,252,369 B1 * | 6/2001 | Kaku et al. | 318/609 |
| 6,515,442 B1 | 2/2003 | Okubo et al. | |
| 6,566,837 B1 | 5/2003 | Zhang et al. | |
| 7,030,588 B2 * | 4/2006 | Tsuruta et al. | 318/727 |

FOREIGN PATENT DOCUMENTS

| | | |
|---|---|---|
| EP | 0967535 | 12/1999 |
| JP | 61-40616 | 2/1986 |
| JP | 1-283080 | 11/1989 |
| JP | 04-140086 | 5/1992 |
| JP | 08-084490 | 3/1996 |
| JP | 2002-006958 | 1/2002 |

* cited by examiner

POSITION CONTROLLER OF MOTOR

FIELD OF THE INVENTION

The present invention relates to a motor position controller and more specifically to a motor position controller suitable for controlling a position of a motor used in machine tools and semiconductor manufacturing equipment for positioning in high speed.

BACKGROUND ART

An example of a conventional motor position controller is shown in FIG. 10 (refer to FIG. 1 in Japanese Patent Laid-open Publication No. 10-254550). In this controller, a difference between a position indicated by a position command and a fed-back position is calculated by a subtractor in a position control unit, and then processed by the position control unit before being output as a speed command. A subtractor in a speed control unit 3 calculates a difference between a fed-back speed, obtained by a speed calculation unit 2 converting the fed-back position output from an encoder E, and the speed indicated by the speed command. This difference is processed by the speed control unit 3, which outputs a torque command to a torque control unit 4. The torque control unit 4 controls an excitation current flowing into a motor M in such a manner to cause the motor M to produce a torque as required by a torque command.

Normally, the position control unit 1 in this controller is constructed as a proportional control (P-control) unit and the speed control unit 3 is built as a proportional-integral control (PI-control) unit. The conventional PI-control unit forming the speed control unit 3 has a configuration shown in FIG. 11. In this PI-control unit a difference between the speed indicated by the speed command and the fed-back speed is calculated by a subtractor SB, and is input through a proportional control system with a gain of 1 to an adder AD. In the integral control system, the difference is multiplied by an integral gain by a multiplier 31 and integrated by a speed integrator 32 before being supplied to the adder AD. The adder AD adds an output of the proportional control system and an output of the integral control system, and sends the result to a multiplier 33, which in turn multiplies the output of the adder AD by a proportional gain and outputs the result as a torque command. By constructing the speed control unit 3 as a PI-control unit, it is possible to minimize not only a transient difference of speed but also a steady state difference.

Generally, control systems have a limited response, which means that a fed-back speed takes long to respond to a speed command. FIG. 12 shows a simulation of a positioning operation in a conventional position controller. In the figure, diagrams represent, from top to bottom, a position command, a position difference (magnified), a speed command, a fed-back speed, a speed integrator output, a torque command, and an in-position state (positioning operation completes). Upon receiving the position command, the motor M begins to rotate. However, after the speed command has been output from the position controller until the fed-back speed is obtained (until the fed-back speed corresponding to the speed command appears), the speed integrator 32 performs a integrating operation. While the motor is rotating at a constant speed, the integrated value decreases. But as the motor M decelerates, the integrating operation is performed again. At the end of the positioning operation, all the remaining integrated value is discharged, and the motor M stops. Thus, in the conventional controller, as shown in FIG. 12, after the position command has become zero, the positioning response is delayed for an amount corresponding to a residual quantity of the remaining integrated value in the speed integrator 32.

To solve this problem, a control method of switching from a proportional control to a proportional-integral control (P-PI switch control) has been proposed. FIG. 13 shows a simulation of a positioning response in the P-PI switch control. Diagrams represent, from top to bottom, a position command, a position difference (magnified), a speed command, a fed-back speed, a speed integrator output, a torque command, and an in-position state (positioning operation completes). In the P-PI switch control, when the motor is rotating, the speed control unit 3 is made to perform a proportional control, immediately before the motor M stops, and is switched to a proportional-integral control. Changing the control mode according to the operation state as described above makes it possible to make the residual quantity, in the speed integrator 32 while the motor is running, zero and to shorten a positioning time while at the same time suppressing a steady state difference when the motor stops. However, if the P-PI switch control method is applied to a control system in which an external force is always applied to a shaft of a motor, such as one that drives a vertical shaft, the positioning time increases, as shown in FIG. 14. FIG. 14 shows a simulation of a positioning response under the P-PI switch control. In this figure, too, diagrams represent, from top to bottom, a position command, a position difference (magnified), a speed command, a fed-back speed, a speed integrator output, a torque command, and an in-position state (positioning operation completes). As can be seen from the speed integrator output of FIG. 14, after the control is changed over to the PI control, the speed integrator 32 compensates for a torque corresponding to the external force. The P-PI control thus has a problem of not being able to shorten the positioning time when an external force is applied to the shaft.

An object of this invention is to provide a motor position controller which can shorten the positioning time even if an external force is applied.

DISCLOSURE OF THE INVENTION

The present invention concerns to an improvement of a motor position controller which comprises a position detection unit, a speed calculation unit, a position control unit, a speed control unit, and a torque control unit. The position detection unit detects a position of a motor to be controlled. The speed calculation unit calculates a speed of the motor. The position control unit performs a position control by outputting a speed command so that the motor position fed back from the position detection unit is consistent with a position indicated by a position command. The speed control unit performs a speed control based on a proportional-integral control by outputting a torque command so that the speed fed back from the speed calculation unit is consistent with the speed indicated by the speed command. The torque control unit performs a torque control based on the torque command.

In this invention, the speed control unit comprises a delay compensation low-pass filter in the speed control unit, an integral control system, a proportional control system, an addition means, and a multiplication means. The delay compensation low-pass filter in the speed control unit has a transfer function corresponding to a delay of a speed control system. The integral control system includes a speed integrator, which integrates a speed difference between a speed indicated by a delay speed command and the speed of the motor. The delay speed command is obtained by inputting the speed command into the delay compensation low-pass filter in the speed control unit. The proportional control system outputs a command proportional to a difference between the speed indicated by the speed command and the speed of the motor. The addition means adds an output of the integral control system and an output of the proportional control system. The multiplication means multiplies an output of the addition means by a speed proportional gain to produce the torque command. In the proportional control system, the speed difference may be multiplied by the speed proportional gain and, in the integral control system, the operand being controlled may be multiplied by the speed proportional gain before being output. With the use of the delay compensation low-pass filter in the speed control unit as proposed in this invention, the difference between the speed indicated by the speed command with a delay corresponding to the delay of the speed control system and the actually delayed fed-back speed can be rendered nearly zero. This makes the residual quantity in the speed integrator almost zero, thus the positioning time is shortened.

When the accuracy of the position detection unit (e.g., encoder) is low, ripples caused by quantization errors and position errors may be included in the speed feedback signal. To address this problem, it is preferable to provide a speed feedback low-pass filter which has a transfer function for preventing ripples, caused by quantization errors and/or position errors detected by the position detection unit, from appearing in the torque command. In this case, the proportional control system includes a subtraction means for calculating a difference between the speed indicated by the speed command and the filtered speed which is obtained by inputting the speed into the speed feedback low-pass filter. If the position detection unit used has high accuracy and resolution, the position errors become smaller, and then this configuration is not necessary to be adopted The position control unit preferably comprises a subtraction means and a position loop multiplication means. The subtraction means calculates a position difference between the position indicated by the position command and the position detected by the position detection unit. The position loop multiplication means multiplies the position difference by the position proportional gain. In this case, it is preferred that the position control unit further includes a differentiator for differentiating the position command, a multiplication means for multiplying the output of the differentiator by the feed forward gain; and a feed forward low-pass filter having a transfer function to eliminate ripples caused by quantization errors of the position command. The position control unit may also be constructed of a differentiator, an integrator, the position loop multiplication means, a multiplication means, and a feed forward low-pass filter. The differentiator differentiates the position command. The integrator integrates a difference between the position command differentiated by the differentiator and a differential value of the position detected by the position detection unit and outputting the result to a position loop multiplication means. The position loop multiplication means multiplies the output of the integrator by the position proportional gain. The multiplication means multiplies the output of the differentiator by the feed forward gain. The feed forward low-pass filter has a transfer function to remove ripples caused by quantization errors of the position command. In these cases, the position control unit outputs as a speed command a sum of the command output from the position loop multiplication means and the speed feed forward command output from the feed forward low-pass filter.

With such a feed forward low-pass filter, ripples caused by quantization errors of the position command unit can be prevented from being included in the speed command itself.

It is also possible to further provide a delay compensation low-pass filter in a position control unit having a transfer function corresponding to the delay of the speed control system. In this case, the position loop multiplication means receives a position difference between the fed-back position and the position command that has passed through the delay compensation low-pass filter in the position control unit. Further, when the difference between the output of the position command differentiator for differentiating a position command and the differential value of the position is integrated by an integrator to obtain the position difference, it is possible to arrange between the differentiator and the integrator the delay compensation low-pass filter in the position control unit having a transfer function corresponding to the delay of the speed control system and to input to the integrator a difference between the output of the differentiator that has passed through the delay compensation low-pass filter in the position control unit and the differential value of the position.

With the delay compensation low-pass filter in the position control unit arranged as described above, the position command and the position feedback signal, both supplied to the position control unit during acceleration, can be made to rise almost simultaneously. This renders the speed command from the position control unit significantly small. With this arrangement, the speed feed forward gain can be 1 or a value close to 1. The positioning time can be therefore further shortened.

BEST MODE FOR IMPLEMENTING THE INVENTION

Figure 1:
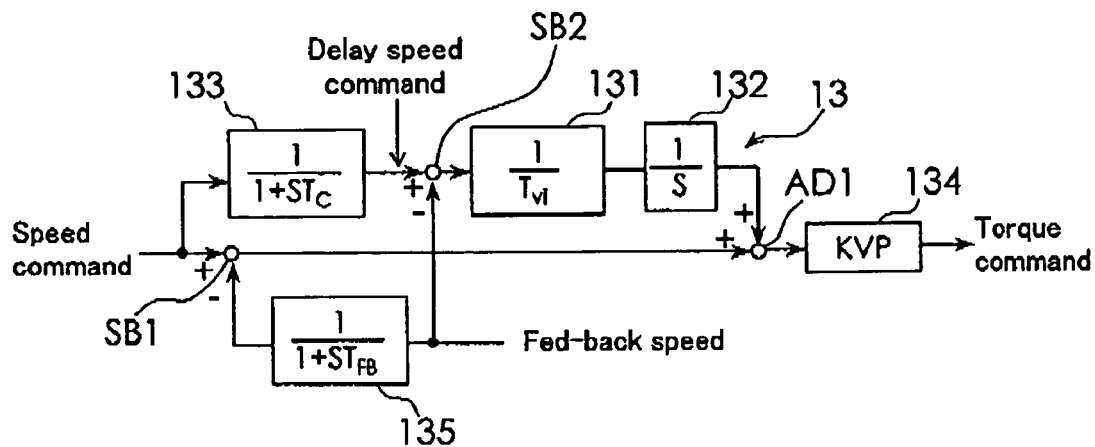
FIG. 1 is a block diagram showing an example configuration of a speed control unit used in this invention.
Figure 2:
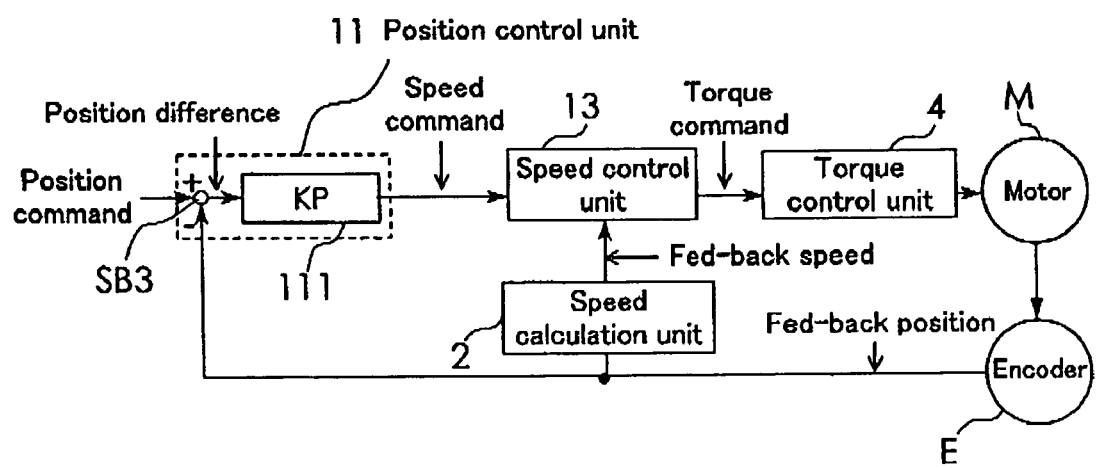
FIG. 2 is a block diagram showing a configuration of a motor position controller system applying the speed control unit of FIG. 1.
Figure 3:
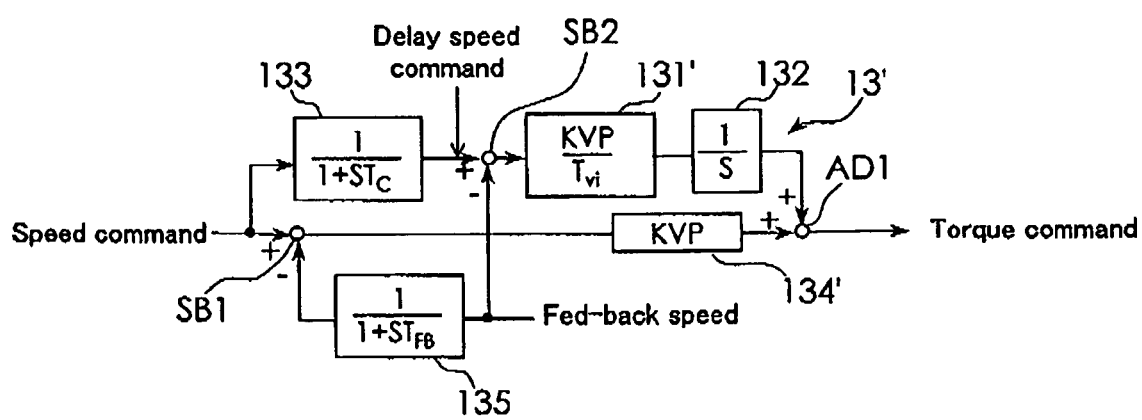
FIG. 3 is a block diagram showing an example configuration of another speed control unit used in this invention.
Figure 10:
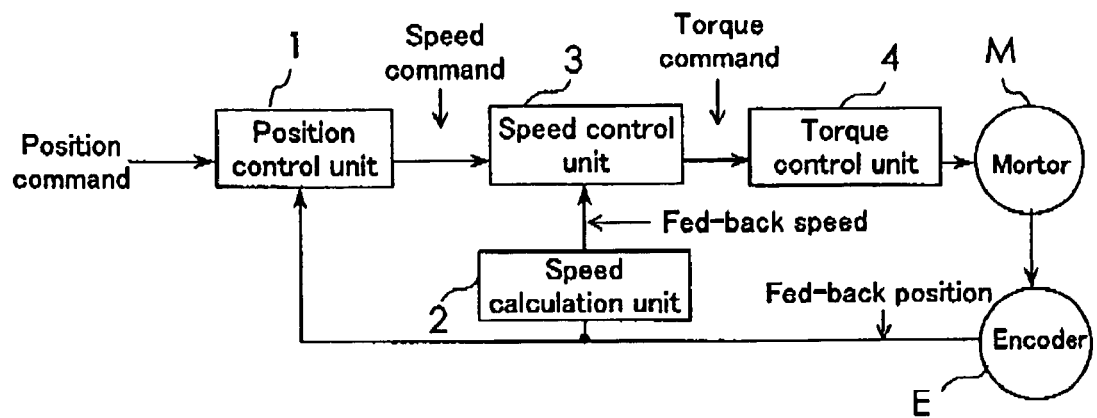
FIG. 10 illustrates a configuration of a conventional motor position controller.
Figure 11:
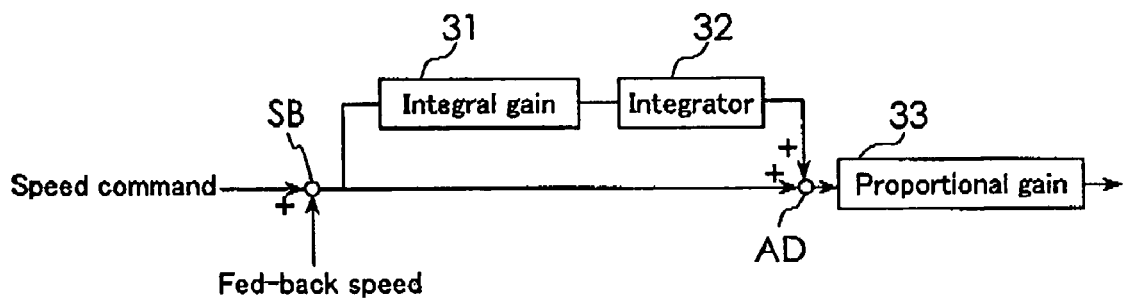
FIG. 11 is a block diagram showing a configuration of a conventional speed control unit.
Figure 12:
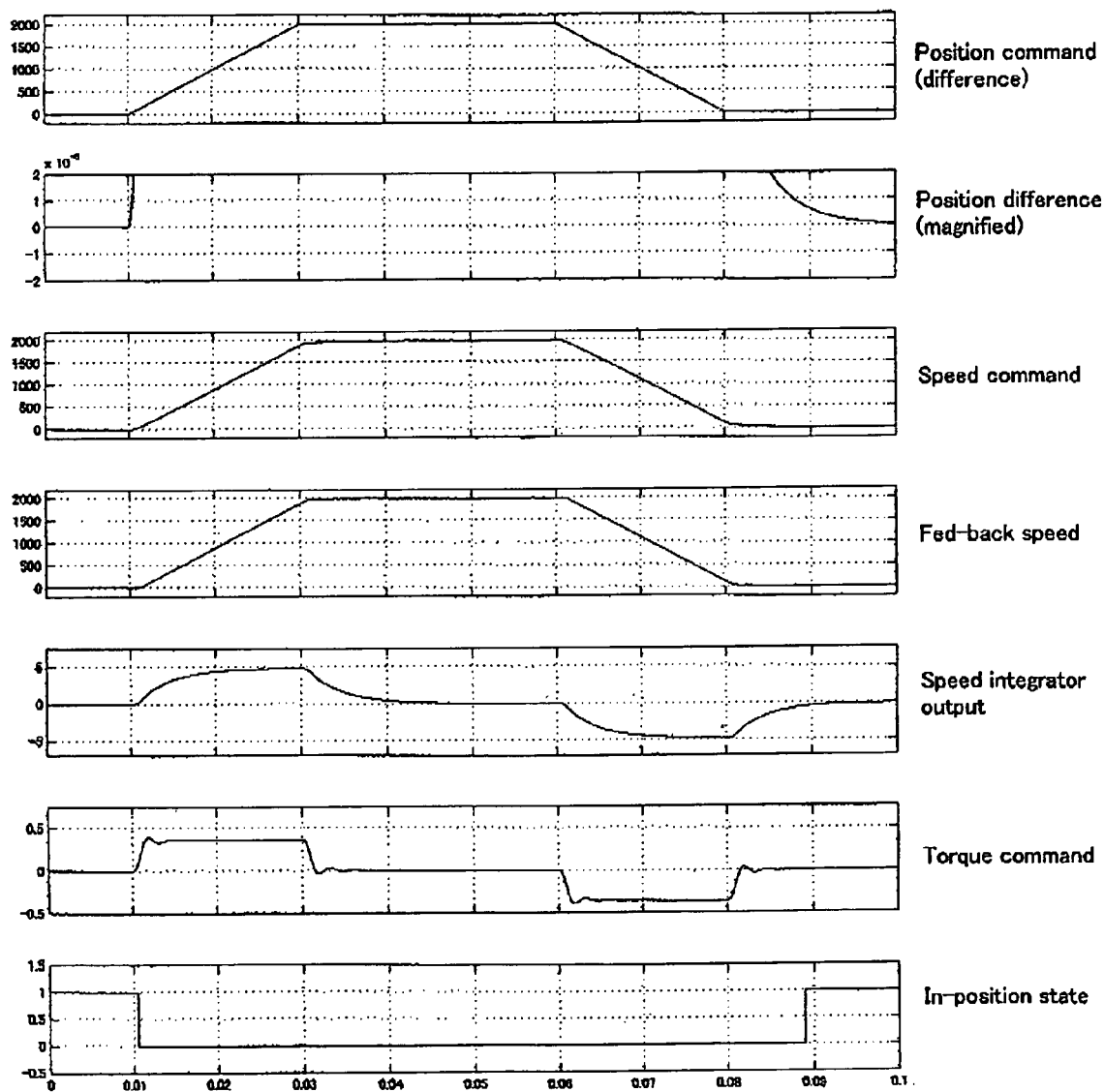
FIG. 12 shows a result of simulation of a positioning operation performed by the conventional position controller.
Figure 13:
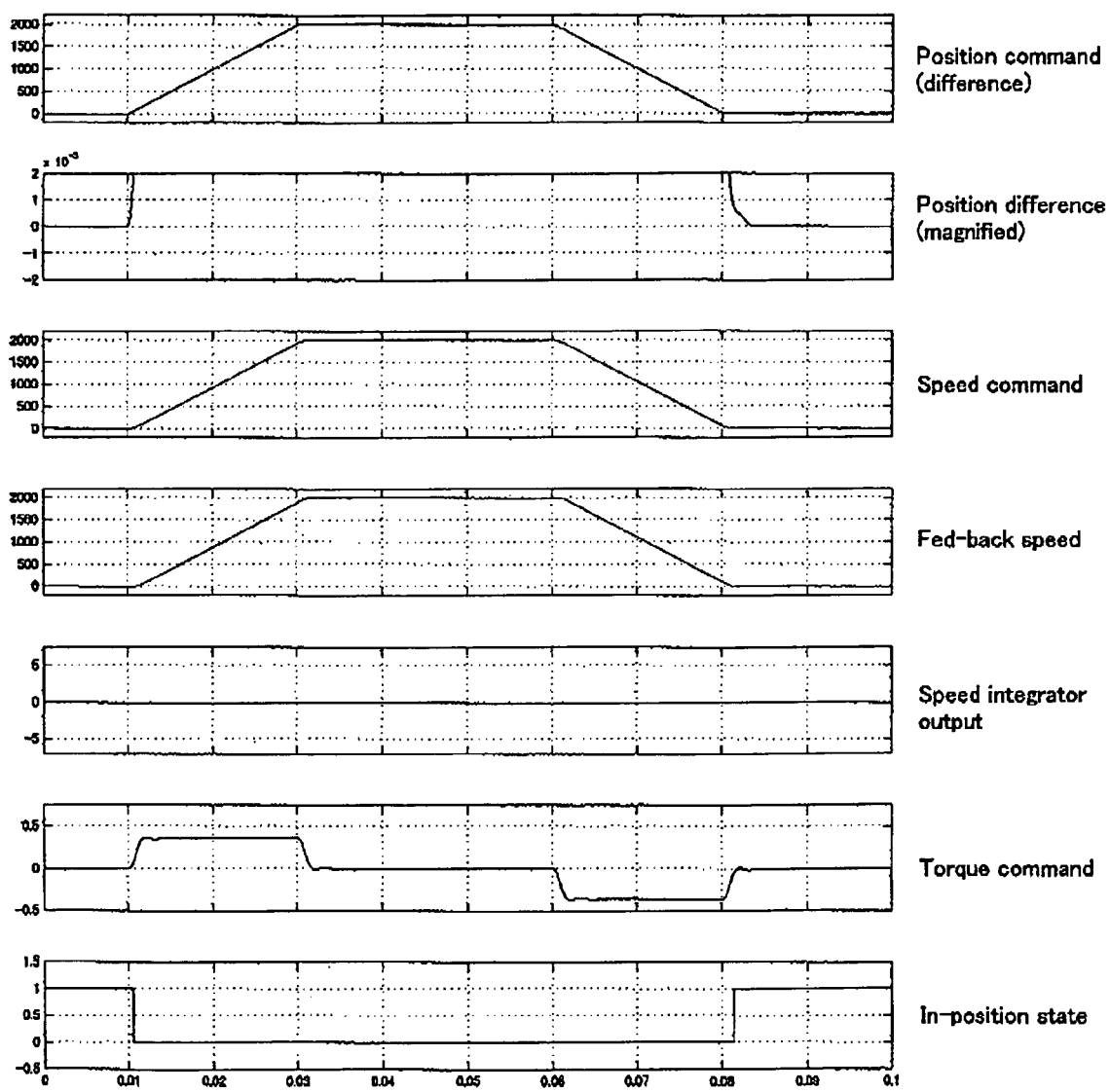
FIG. 13 shows a result of simulation of a positioning response in a P-PI switch control.
Figure 14:
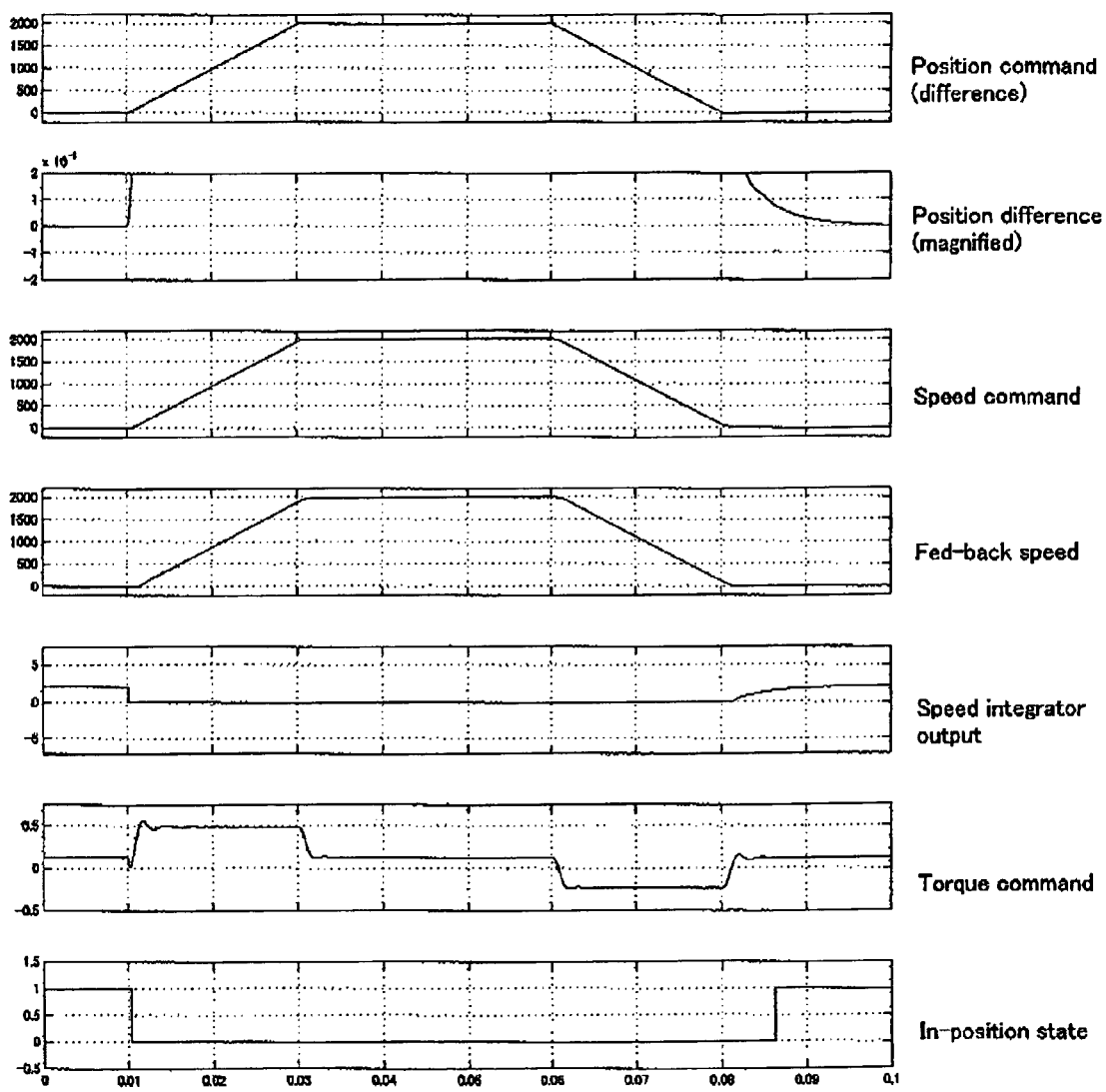
FIG. 14 shows a result of simulation of a positioning response in a P-PI switch control, when a vertical shaft is taken as an object to be controlled.

FIG. 1 is a block diagram showing an example configuration of a speed control unit 13 used in this invention. FIG. 3 is a block diagram showing a configuration of a motor position controller system applying the speed control unit 13. The system configuration of FIG. 2 is essentially similar to the conventional configuration shown in FIG. 10 except for the speed control unit 13.

This system has an encoder E as a position detection unit for detecting the position of a motor M which is an object to be controlled. An output of the encoder E is a fed-back position representing the position of a motor output shaft. A speed calculation unit 2 calculates a motor speed based on the output of the encoder E and the output of the speed calculation unit 2 is a fed-back speed representing the speed of the output shaft of the motor M. A position controller 11 performs a position control by outputting a speed command so that the position of the motor M fed back from the encoder E as a position detection unit is consistent with a position indicated by a position command. The position controller 11 of FIG. 2 comprises a subtraction means SB3 for calculating a position difference between the position indicated by the position command and the position detected by the position detection unit, and a position loop multiplication means 111 for multiplying the position difference by a position proportional gain KP.

The speed control unit 13 performs a speed control based on a proportional-integral control by outputting a torque command so that the speed fed back from the speed calculation unit 2 is consistent with the speed indicated by the speed command. As shown in FIG. 1, the speed control unit 13 of this embodiment has a delay compensation low-pass filter 133 in the speed control unit which has a transfer function $(1/(1+ST_c))$ corresponding to a delay of the speed control system. The speed control unit 13 includes an integral control system, made up of a multiplication means 131 and a speed integrator 132, and a proportional control system which outputs a command proportional to the speed command. The multiplication means 131 multiplies an integral gain $(1/T_{vi})$ by a speed difference, calculated by a subtraction means SB2, between the fed-back speed and the speed indicated by the delay speed command. The delay speed command is obtained by passing the speed command through the delay compensation low-pass filter 133 in the speed control unit. The speed integrator 132 is adapted to integrate an output of the multiplication means 131. The speed control unit 13 also includes a multiplication means 134 which multiplies a sum of an output of the integral control system and an output of the proportional control system by a speed proportional gain KVP to produce a torque command. This is a basic configuration. This example further includes a speed feedback low-pass filter 135 with a transfer function $(1/(1+ST_{FB}))$ which prevents ripples caused by quantization errors and/or position errors detected by the encoder (position detection unit) from appearing in the torque command. In this case, the proportional control system includes a subtraction means SB1 to calculate a difference between the speed indicated by the speed command and a filtered speed that is obtained by passing the fed-back speed through the speed feedback low-pass filter 135.

In this example, a difference is taken by the subtraction means SB2 between the speed indicated by the speed command passed through the delay compensation low-pass filter 133 in the speed control unit and the fed-back speed. This difference is multiplied by the speed integral gain $(1/T_{vi})$ and passed through the integrator 132. Further, the subtraction means SB1 calculates a difference between the speed indicated by the speed command and the fed-back speed passed through the speed feedback low-pass filter 135. This difference is added to the output of the integrator 132 by an addition means AD1. In a final step, the sum is multiplied by the speed proportional gain (KVP) to produce a torque command.

The speed feedback low-pass filter 135 is a filter to eliminate ripples caused by the quantization errors and position errors detected by the encoder E. This filter is provided only in the feedback of the proportional control system to prevent ripple components from appearing in the torque command. In the integral control system, such a filter is not necessary because the speed integrator 132 performs a smoothing operation.

The delay compensation low-pass filter 133 in the speed control unit sets a time corresponding to a delay of the speed control system so that the output of the delay compensation low pass filter and the speed feedback signal rise almost simultaneously, thereby reducing the residual quantity in the speed integrator 132 when the speed command changes. By constructing the speed control unit 13 as described above, the control of ripples found in the speed feedback signal and the reduction in the residual quantity of the speed integrator 132 when the speed command changes can be accomplished at the same time.

When the quantization errors detected by the encoder E are small, the speed feedback low-pass filter 135 is not required. The transfer function in the delay compensation low-pass filter 133 is not limited to the transfer function of this embodiment but may be of any type as long as it can simulate or represent a delay of the speed control system.

In the controller of FIG. 2, a difference between the position indicated by the position command and the fed-back position is taken by the subtraction means SB3 in the position controller 11. The position control unit multiplies this value by the position proportional gain KP to produce a speed command. Then, a difference between the speed indicated by the speed command and the fed-back speed is taken by the subtraction means SB1 (FIG. 1) in the speed control unit 13 and then output as a torque command from the speed control unit 13. The torque control unit 4 controls a current to produce a torque as required by the torque command.

FIG. 3 is a block diagram showing a variation of the speed control unit 13'. Comparison between the speed control unit 13 of FIG. 1 and the speed control unit 13' shows that the construction of the speed control unit 13' of FIG. 3 differs from that of the speed control unit 13. The difference is that a multiplication means 134' with a speed proportional gain KVP is arranged inside the proportional control system (it is provided before the addition means AD1), while in the integral control system a transfer function of a multiplication means 131' is changed in order to multiply an operand by the speed proportional gain KVP. This arrangement can also produce the similar effect to that of the speed control unit 13 of FIG. 1.

Figure 4:
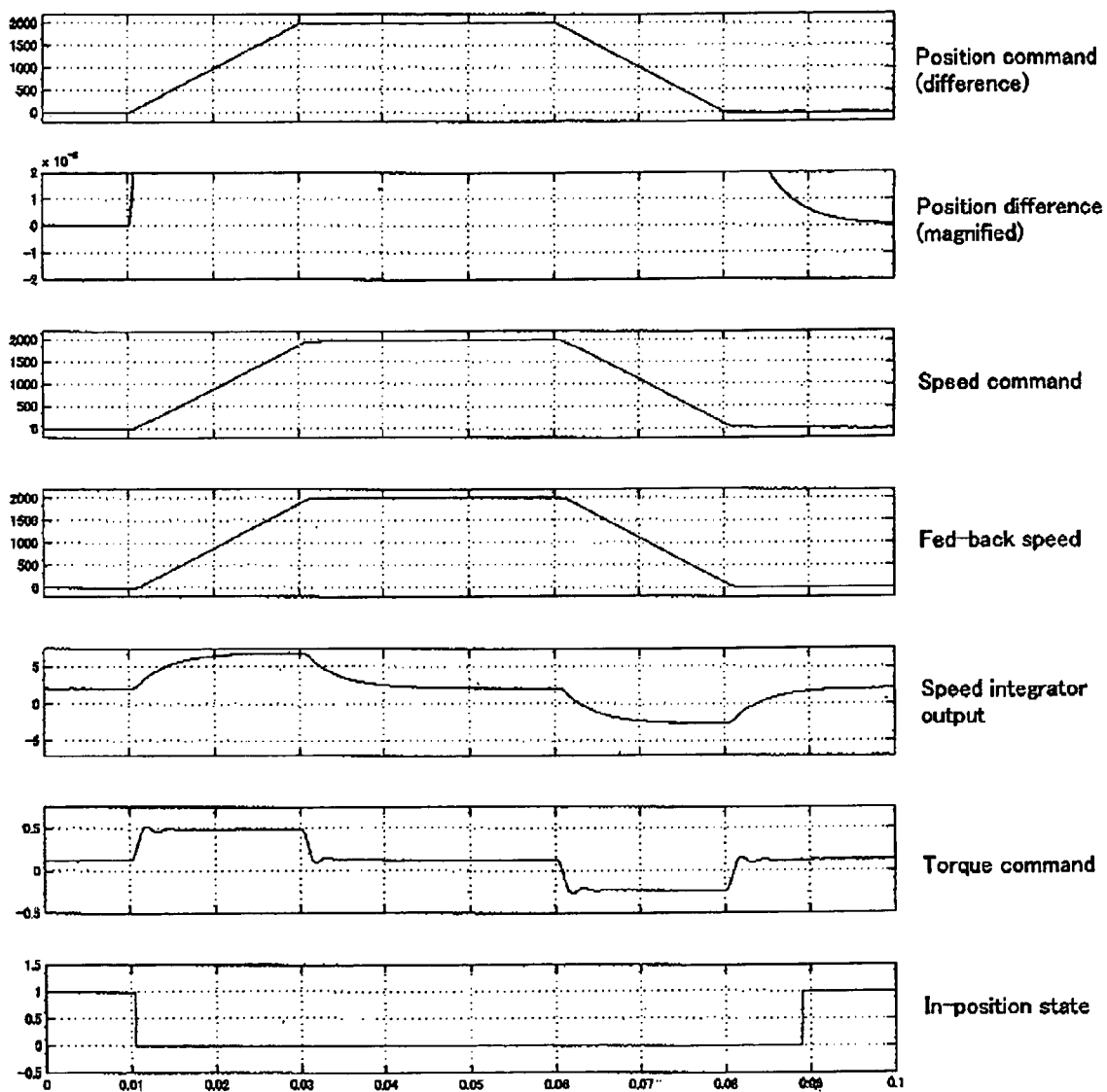
FIG. 4 shows a result of simulation in which an external force is applied to an output shaft of a motor, when no delay compensation low-pass filter is provided in the speed control unit.
Figure 5:
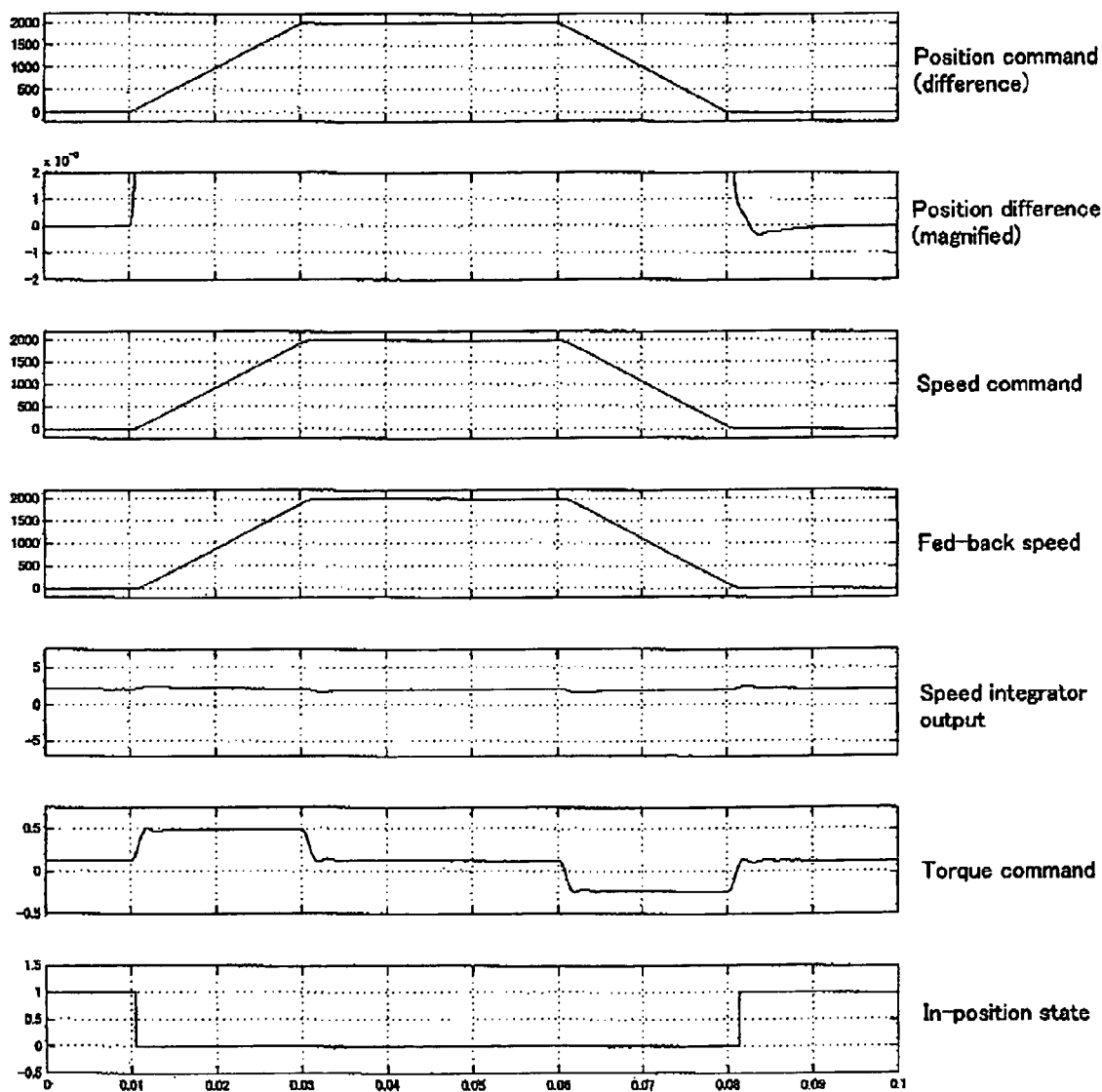
FIG. 5 shows a result of simulation in which an external force is applied to an output shaft of a motor, when a delay compensation low-pass filter is provided in the speed control unit.

FIG. 4 and FIG. 5 show results of simulations in this control system when an external force is applied to the output shaft of the motor M (e.g., when the output shaft of the motor is a vertical shaft). FIG. 4 represents a simulation result when the delay compensation low-pass filter 133 in the speed control unit is not provided. FIG. 5 represents a simulation result when the delay compensation low-pass filter 133 in the speed control unit is provided. When the delay compensation low-pass filter 133 in the speed control unit is not provided, the value of the speed integrator 132 varies as the motor accelerates or decelerates. When the delay compensation low-pass filter 133 in the speed control unit is provided, however, the value of the speed integrator 132 remains almost constant. When the delay compensation low-pass filter 133 in the speed control unit is not provided, the positioning time is long, and when the delay compensation low-pass filter 133 in the speed control unit is provided, the positioning time can be shortened. The speed integrator 132 holds a value corresponding to the constant external force. This invention is also applicable where no external force is applied.

Figure 6:
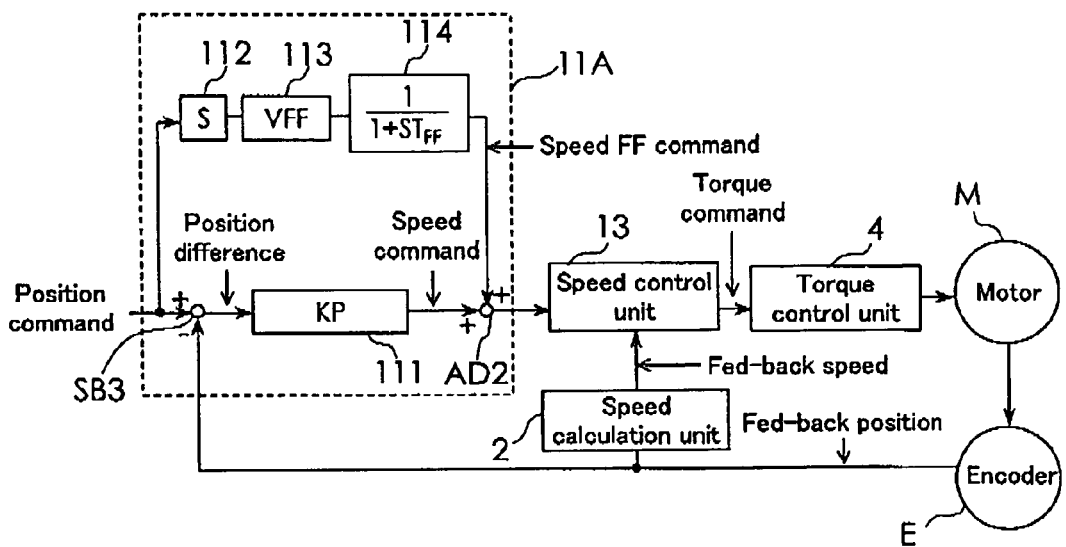
FIG. 6 is a block diagram showing a configuration of a motor position controller in another embodiment of this invention.

FIG. 6 is a block diagram showing a configuration of another embodiment of the motor position controller according to this invention. In FIG. 6, the reference numerals same as those in FIG. 1 and FIG. 2 are assigned for the configurations same as those in FIG. 1 and FIG. 2, and their explanations are omitted. In this embodiment, a position control unit 11A also includes a differentiator 112 that differentiates a position command, a multiplication means 113 that multiplies the output of the differentiator by a feed forward gain VFF, and a feed forward low-pass filter 114 that has a transfer function $(1/(1+ST_{FF}))$ to remove ripples caused by quantization error of the position command. In this case, the position control unit 11A outputs as the speed command a sum, calculated by an addition means AD2, of the command output from the position loop multiplication means 111 and the speed feed forward command (speed FF command) output from the feed forward low-pass filter 114. The use of such a feed forward low-pass filter 114 can prevent ripples caused by quantization errors present in the position command from being included in the speed command itself.

Normally, the feed forward gain VFF is set at around 40–60% (0.4–0.6). The feed forward low-pass filter 114, as described above, is a filter to minimize ripples caused by quantization errors of the position command. A difference between the position indicated by the position command and the fed-back position is taken by the subtraction means SB3, and then multiplied by the position proportional gain KP to produce a speed command. The speed command is passed through the speed control unit 13 (or 13') to produce a torque command. In the device of this embodiment, by adding the feed forward system, the positioning time can be shortened more than that in FIG. 2.

Figure 7:
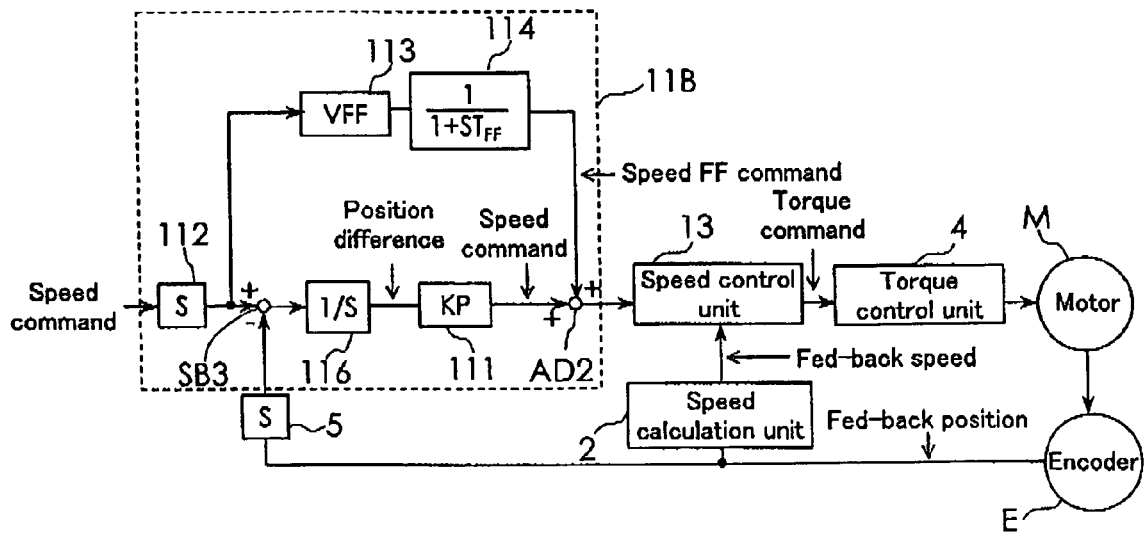
FIG. 7 is a block diagram showing a configuration of a motor position controller in still another embodiment of this invention.

FIG. 7 is a block diagram showing a variation of the above embodiment of FIG. 6. The embodiment of FIG. 7 differs from the embodiment of FIG. 6 in the construction of a position control unit 11B. In FIG. 7, the reference numerals same as those in FIG. 6 are assigned for the configurations same as those in FIG. 6, and their explanations are omitted. Comparison between the two embodiments shows that the embodiment of FIG. 7 differs from the embodiment of FIG. 6 in that the differentiator 112 is put at a different position and that an integrator 116 and a differentiator 5 are newly added. That is, the position control unit 11B comprises the differentiator 112 that differentiates the position command, the differentiator 5 that differentiates the position detected by the position detection unit, the integrator 116 that integrates the difference (position differential difference) between an output of the differentiator 112 (differential position command) and an output of the differentiator 5 (differential position), the position loop multiplication means 111 that multiplies the output of the integrator 116 by the position proportional gain, the multiplication means 113 that multiplies the output of the differentiator 112 by the feed forward gain, and the feed forward low-pass filter 114 that has a transfer function to eliminate ripples caused by quantization errors of the position command. With this configuration, too, the similar effect to that of the above embodiment of FIG. 6 can be obtained.

Figure 8:
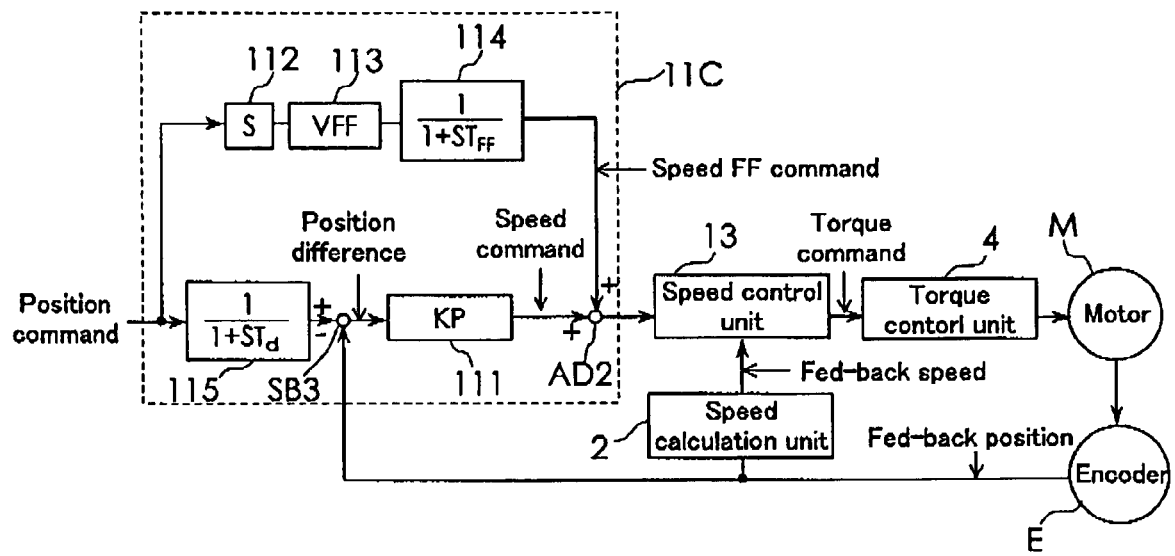
FIG. 8 is a block diagram showing a configuration of a motor position controller in yet another embodiment of this invention.

FIG. 8 is a block diagram showing a configuration of still another embodiment of the motor position controller according to this invention. In FIG. 8, the reference numerals same as those in FIG. 6 are assigned for the configurations same as those in FIG. 6, and their explanations are omitted. This embodiment differs from the embodiment of FIG. 6 in that a position control unit 11C further includes a delay compensation low-pass filter 115 in the position control unit with a transfer function $(1/(1+SDd))$ corresponding to the delay of the speed control system. In this embodiment, a position difference between the position command that has passed through the delay compensation low-pass filter 115 in the position control unit and the position feed back signal is calculated by the subtraction means SB3, and is then input to the position loop multiplication means 111. In this example, the feed forward gain VFF is set to 1 or a value close to 1.

The delay of the speed control system is set as a transfer function for the delay compensation low-pass filter 115 in the position control unit. The transfer function of the delay compensation low-pass filter 115 in the position control unit is determined so that the output of the delay compensation low-pass filter 115 in the position control unit and the position feedback signal rise almost simultaneously. The addition of the delay compensation low-pass filter 115 in the position control unit renders the output of the position loop multiplication means 111 in the position control unit 11C significantly small. In this device, with adding the delay compensation low-pass filter 115 in the position control unit, it is possible to increase the feed forward gain VFF to 100% or a value close to 100% (1 or close to 1). Therefore the positioning time can be shortened almost as much as, or a little less than that of the embodiment in FIG. 6.

Figure 9:
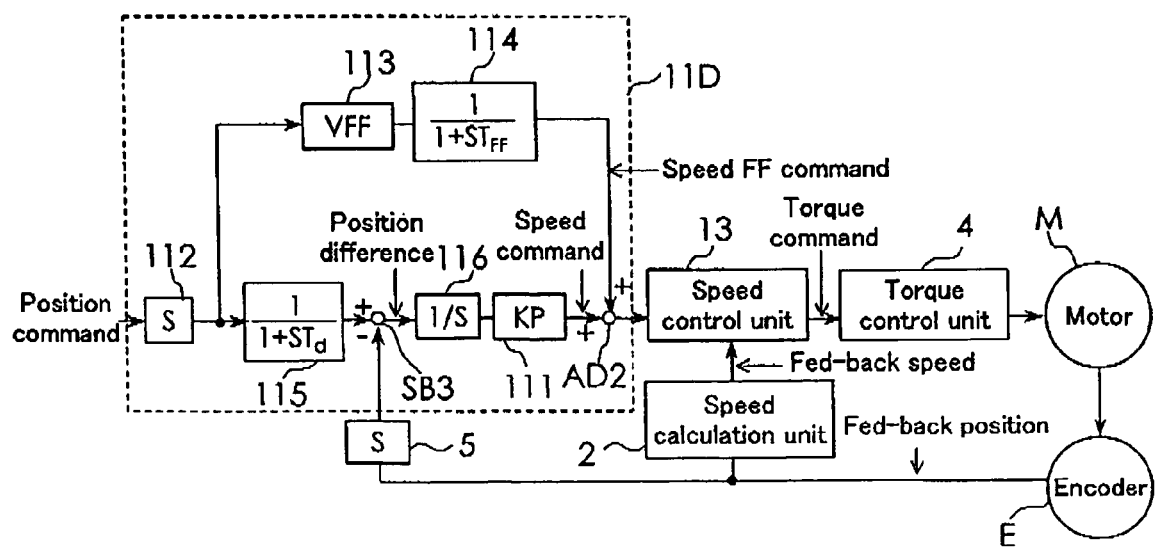
FIG. 9 is a block diagram showing a configuration of a motor position controller in a further embodiment of this invention.

FIG. 9 shows a configuration which has the compensation low-pass filter 115 in the position control unit added in FIG. 7. Thus, a position control unit 11D in this embodiment differs from that of FIG. 7. In other respects this embodiment is similar to FIG. 7 and their explanations are omitted.

INDUSTRIAL APPLICABILITY

Since this invention uses a delay compensation low-pass filter in a speed control unit, a difference between the speed command having a delay corresponding to the delay of the speed control system and the speed of the actually delayed fed-back speed can be made close to zero, the residual quantity of the speed integrator is rendered almost zero. The positioning time is shortened. The position controller of a simple configuration according to this invention therefore can reduce the positioning time when an external force is applied, and thus can realize a faster positioning control.

The invention claimed is:

1. A motor position controller comprising:
   a position detection unit for detecting a position of a motor to be controlled;
   a speed calculation unit for calculating a speed of the motor;
   a position control unit for performing a position control by outputting a speed command so that the motor position fed back from the position detection unit is consistent with a position indicated by a position command;
   a speed control unit for performing a speed control based on a proportional-integral control by outputting a torque command so that the speed fed back from the speed calculation unit is consistent with the speed indicated by the speed command; and
   a torque control unit for performing a torque control based on the torque command;
   wherein the speed control unit comprises:
      a delay compensation low-pass filter in the speed control unit having a transfer function corresponding to a delay of a speed control system;
      an integral control system including a speed integrator, the speed integrator being adapted to integrate a speed difference between a speed indicated by a delay speed command and the speed of the motor, the delay speed command being obtained by inputting the speed command into the delay compensation low-pass filter in the speed control unit;
      a proportional control system for outputting a command proportional to a difference between the speed indicated by the speed command and the speed of the motor;
   an addition means for adding an output of the integral control system and an output of the proportional control system; and
   a multiplication means for multiplying an output of the addition means by a speed proportional gain to produce the torque command.

2. The motor position controller according to claim 1, further including:
   a speed feedback low-pass filter having a transfer function that prevents ripples caused by quantization errors and/or position errors detected by the position detection unit, from appearing in the torque command;
   wherein the proportional control system includes a subtraction means for calculating a difference between a filtered speed and the speed indicated by the speed command, the filtered speed being obtained by inputting the speed into the speed feedback low-pass filter.

3. The motor position controller according to claim 1, wherein the position control unit comprises:
   a subtraction means for calculating a position difference between the position indicated by the position command and the position detected by the position detection unit; and
   a position loop multiplication means for multiplying the position difference by a position proportional gain.

4. The motor position controller according to claim 3, wherein the position control unit further includes:
   a differentiator for differentiating the position command;
   a multiplication means for multiplying an output of the differentiator by a feed forward gain; and
   a feed forward low-pass filter having a transfer function for removing ripples caused by quantization errors of the position command;
   wherein the position control unit outputs as the speed command a sum of a command output from the position loop multiplication means and a speed feed forward command output from the feed forward low-pass filter.

5. The motor position controller according to claim 3, wherein the position control unit further includes:
   a differentiator for differentiating the position command;
   a multiplication means for multiplying an output of the differentiator by a feed forward gain;
   a feed forward low-pass filter having a transfer function for removing ripples caused by quantization errors of the position command; and
   an integrator for integrating a difference between an output of the differentiator and a differential value of the position detected by the position detection unit and to output the position difference to the position loop multiplication means;
   wherein the position control unit outputs as the speed command a sum of a command output from the position loop multiplication means and a speed feed forward command output from the feed forward low-pass filter.

6. The motor position controller according to claim 4, wherein the feed forward gain is set in a range of 0.4 to 0.6.

7. The motor position controller according to claim 4, further including a delay compensation low-pass filter in the position control unit having a transfer function corresponding to a delay of the speed control system;
   wherein the position difference between the position indicated by the position command that has passed through the delay compensation low-pass filter in the position control unit and the position is input into the position loop multiplication means.

8. The motor position controller according to claim 4, wherein the delay compensation low-pass filter in the position control unit having a transfer function corresponding to a delay of the speed control system is arranged between the differentiator and the integrator;
   wherein a difference between an output of the differentiator that has passed through the delay compensation low-pass filter in the position control unit and the differential value of the position is input into the integrator.

9. The motor position controller according to claim 7, wherein the feed forward gain is 1 or a value close to 1.

10. A motor position controller comprising:
    a position detection unit for detecting a position of a motor to be controlled;
    a speed calculation unit for calculating a speed of the motor;
    a position control unit for performing a position control by outputting a speed command so that the motor position fed back from the position detection unit is consistent with a position indicated by a position command;
    a speed control unit for performing a speed control based on a proportional-integral control by outputting a torque command so that the speed fed back from the speed calculation unit is consistent with the speed indicated by the speed command; and
    a torque control unit for performing a torque control based on the torque command;
    wherein the speed control unit comprises:
       a delay compensation low-pass filter in the speed control unit having a transfer function corresponding to a delay of a speed control system;

an integral control system including a speed integrator, the speed integrator being adapted to integrate a speed difference between a speed indicated by a delay speed command and the speed of the motor, the delay speed command being obtained by inputting the speed command into the delay compensation low-pass filter in the speed control unit, the integral control system multiplying an operand in the control system by a speed proportional gain to produce an output;

a proportional control system for producing a command by multiplying a difference, between the speed indicated by the speed command and the speed of the motor, by the speed proportional gain; and an addition means for adding an output of the integral control system and an output of the proportional control system.

11. The motor position controller according to claim 10, further including:

a speed feedback low-pass filter having a transfer function that prevents ripples caused by quantization errors and/or position errors detected by the position detection unit from appearing in the torque command;

wherein the proportional control system includes a subtraction means for calculating a difference between a filtered speed and the speed indicated by the speed command, the filtered speed being obtained by inputting the speed of the motor into the speed feedback low-pass filter.

12. The motor position controller according to claim 10, wherein the position control unit comprises:

a subtraction means for calculating a position difference between the position indicated by the position command and the position detected by the position detection unit; and a position loop multiplication means for multiplying the position difference by a position proportional gain.

13. The motor position controller according to claim 12, wherein the position control unit further includes:

a differentiator for differentiating the position command;
a multiplication means for multiplying an output of the differentiator by a feed forward gain; and
a feed forward low-pass filter having a transfer function to remove ripples caused by quantization errors of the position command;

wherein the position control unit outputs as the speed command a sum of a command output from the position loop multiplication means and a speed feed forward command output from the feed forward low-pass filter.

14. The motor position controller according to claim 12, wherein the position control unit further includes:

a differentiator for differentiating the position command;
a multiplication means for multiplying an output of the differentiator by a feed forward gain;
a feed forward low-pass filter having a transfer function to remove ripples caused by quantization errors of the position command; and an integrator for integrating a difference between an output of the differentiator and a differential value of the position detected by the position detection unit and output the position difference to the position loop multiplication means;

wherein the position control unit outputs as the speed command a sum of a command output from the position loop multiplication means and a speed feed forward command output from the feed forward low-pass filter.

15. The motor position controller according to claim 13, wherein the feed forward gain is set in a range of 0.4 to 0.6.

16. The motor position controller according to claim 13, further including a delay compensation low-pass filter in the position control unit having a transfer function corresponding to a delay of the speed control system;

wherein the position difference between the position indicated by the position command that has passed through the delay compensation low-pass filter in the position control unit and the position of the motor is input into the position loop multiplication means.

17. The motor position controller according to claim 14, wherein the delay compensation low-pass filter in the position control unit having a transfer function corresponding to a delay of the speed control system is arranged between the differentiator and the integrator;

wherein a difference between an output of the differentiator that has passed through the delay compensation low-pass filter in the position control unit and the differential value of the position of the motor is input into the integrator.

18. The motor position controller according to claim 16, wherein the feed forward gain is 1 or a value close to 1.

19. The motor position controller according to claim 5, wherein the feed forward gain is set in a range of 0.4 to 0.6.

20. The motor position controller according to claim 14, wherein the feed forward gain is set in a range of 0.4 to 0.6.

21. The motor position controller according to claim 1, wherein, through the use of the delay compensation low-pass filter in the speed control, the difference between a speed indicated by the speed command with the delay corresponding to the delay of the speed control system and the actually delayed fed-back speed can be rendered nearly zero, and causing a residual quantity in the speed integrator to approach zero, and thereby reducing a motor positioning time.

22. The motor position controller according to claim 10, wherein, through the use of the delay compensation low-pass filter in the speed control, the difference between a speed indicated by the speed command with a delay corresponding to the delay of the speed control system and the actually delayed fed-back speed can be rendered nearly zero, and causing a residual quantity in the speed integrator to approach zero, and thereby reducing a motor positioning time.

* * * * *